Figure 1:
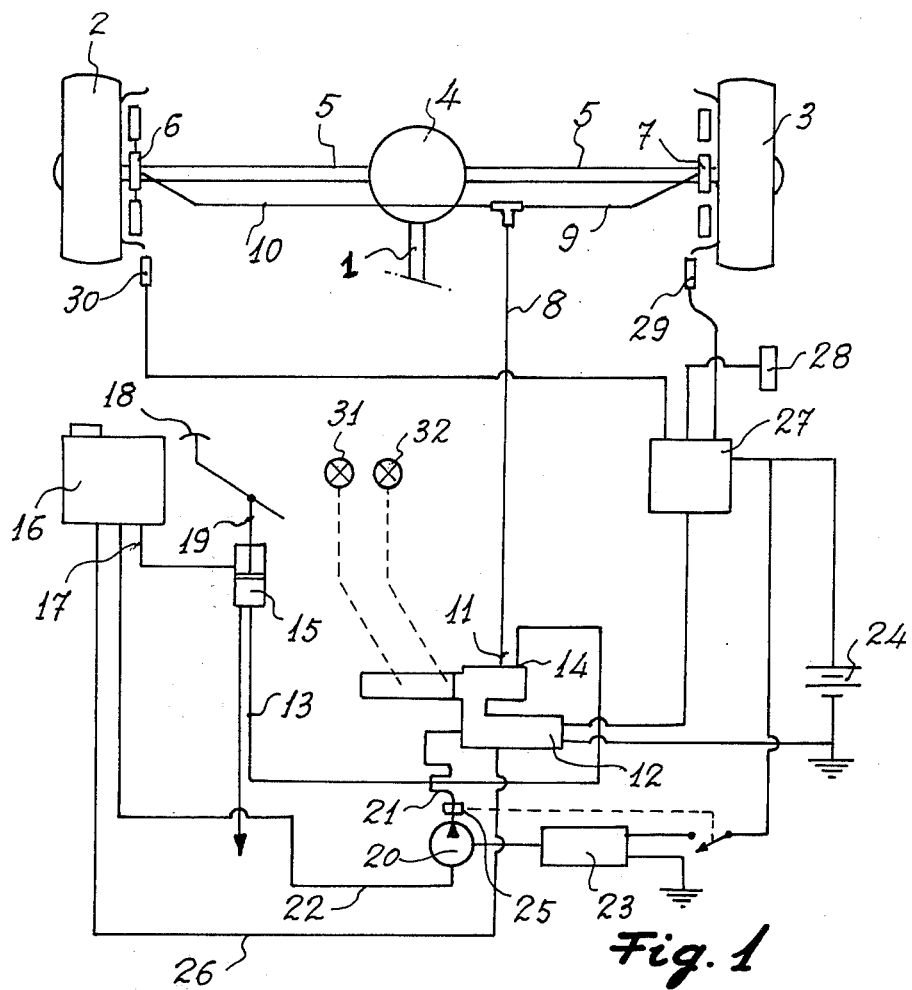

United States Patent [19]
Toms

[11] 3,989,313
[45] Nov. 2, 1976

[54] PRESSURE CONTROL VALVE FOR HYDRAULIC BRAKING SYSTEMS OF WHEELED VEHICLES

[75] Inventor: Peter E. Toms, Madrid, Spain

[73] Assignee: Fabrica Espanola Magnetos, S.A., Madrid, Spain

[22] Filed: Mar. 12, 1975

[21] Appl. No.: 557,488

[30] Foreign Application Priority Data
Aug. 9, 1974  Spain ................................ 429,133

[52] U.S. Cl. ............................... 303/21 F; 303/61
[51] Int. Cl.² .......................................... B60T 8/04
[58] Field of Search .................. 188/181 A, 181 R; 303/21 F, 61

[56] References Cited
UNITED STATES PATENTS

| | | | |
|---|---|---|---|
| 3,514,161 | 5/1970 | Frayer | 303/21 F SV |
| 3,851,930 | 12/1974 | Grosseau | 303/21 F SV |

Primary Examiner—Duane A. Reger
Attorney, Agent, or Firm—Friedman, Goodman & Teitelbaum

[57] ABSTRACT

A pressure control valve applicable to anti-skid devices in automobile vehicles is provided with two hydraulically independent fluid circuits. One circuit controls the actuation of vehicle's brakes and the other circuit controls the braking effect of the vehicle's wheels to avoid skidding of the vehicle. Both circuits are related through the functions of two pistons, one piston being for storage to serve as an intermediary between a control fluid and a spring which accumulates energy and work as a differential piston, and the other piston being for the main actuation of the valve. The axial movements of the pistons allow the brake circuit fluid to compress or decompress as well as to open and close a valve which connects the conventional brake circuit to the anti-skid system.

10 Claims, 4 Drawing Figures

PRESSURE CONTROL VALVE FOR HYDRAULIC BRAKING SYSTEMS OF WHEELED VEHICLES

This invention relates to hydraulic braking systems for vehicles and of the kind in which a slave or wheel cylinder is supplied with fluid under pressure from a high pressure source through a pressure control valve, which acts in such a way as to regulate the pressure within the slave cylinder for reducing the braking effort of the wheel in accordance with signals given by an anti-skid device.

It is known that in order to obtain maximum vehicle decceleration and to maintain maximum stability during the braking of a wheeled vehicle on wet or slippery road surfaces, the wheels must remain in non-locked condition.

It is further known that the optimum value of the coefficient of adhesion between the braked wheel and a wet road surface occurs when the wheel has a slippage value between 15–20%. The value of wheel slippage is given by the formula:

$$\lambda = \frac{V_V - V_R}{V_V}$$

where $V_V$ and $V_R$ are the velocities of the vehicle and the braked wheel respectively.

According to the present invention, in a skid control means of the kind set forth, there consists a first part of the valve controlling communication between the inlet and outlet passages of the housing which are connected to the pressure source and wheel slave cylinders respectively, and a second valve part connected to a pressure responsive member which normally holds the first actuating part in the open position permitting communication between the inlet and outlet passages, by means of fluid pressure supplied by a second fluid pressure source, such as a pump driven independently.

Means for moving the valve pressure responsive member consists of an electrical solenoid to transfer fluid pressure in a manner adapted to move the piston of the plunger in the reverse direction and thus control the communication between the inlet and outlet passages of the valve first part.

There is provided a further embodiment of the anti-skid means including a valve control member which electronically detects the optimum wheel slip value and thereby emits control signals to the aforementioned solenoid member in a manner to bring about operation of the pressure control valve to increase or decrease the wheel braking effort in a predetermined way. The electronic valve control member is not herein described, having been fully described in U.S. Patent application Ser. Nos. 477,999 and 515,496.

Figure 2A:
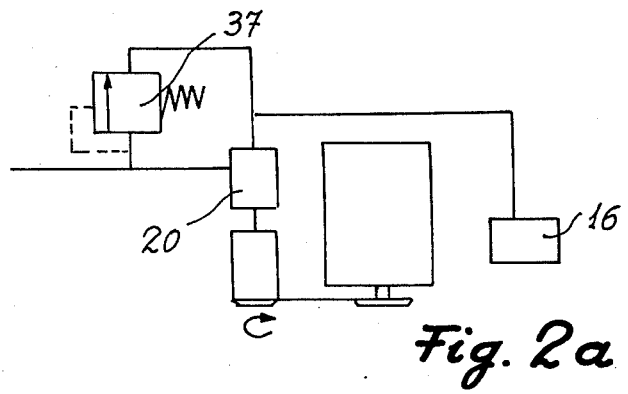
Figure 2:
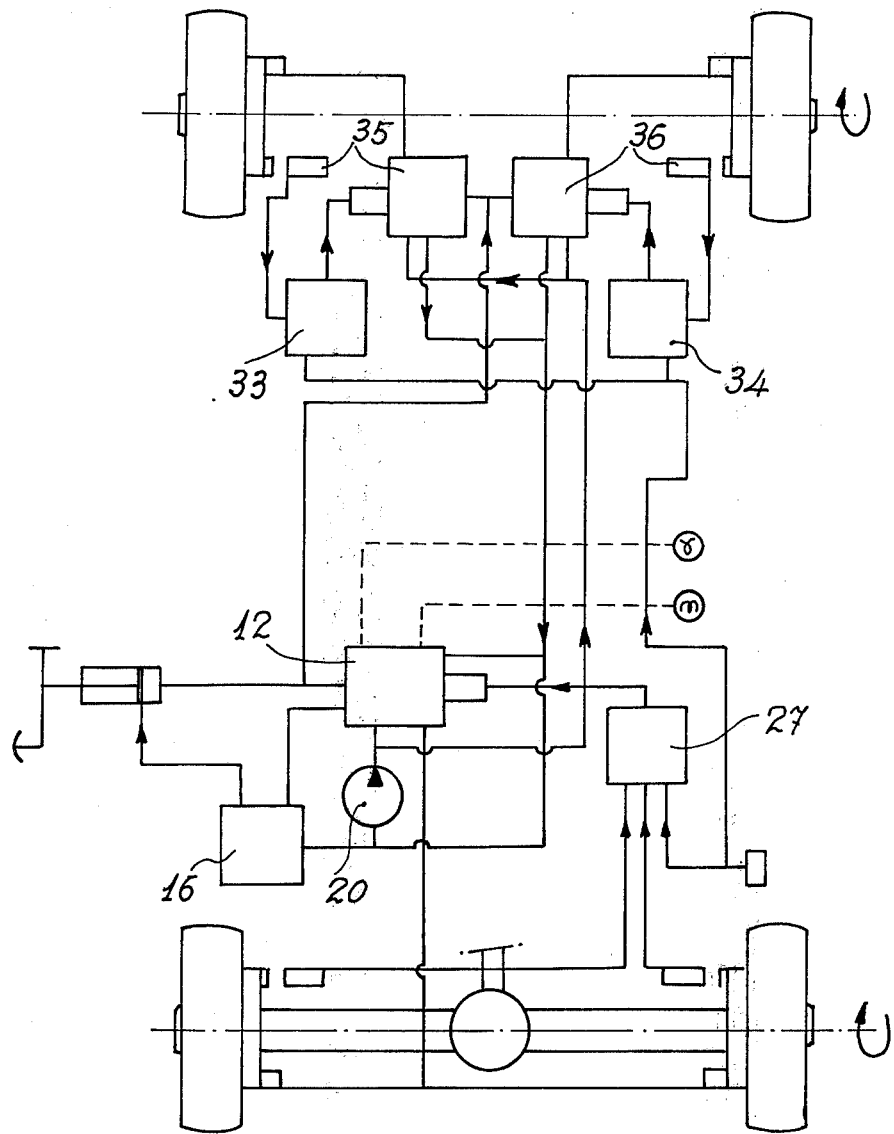
Figure 3:
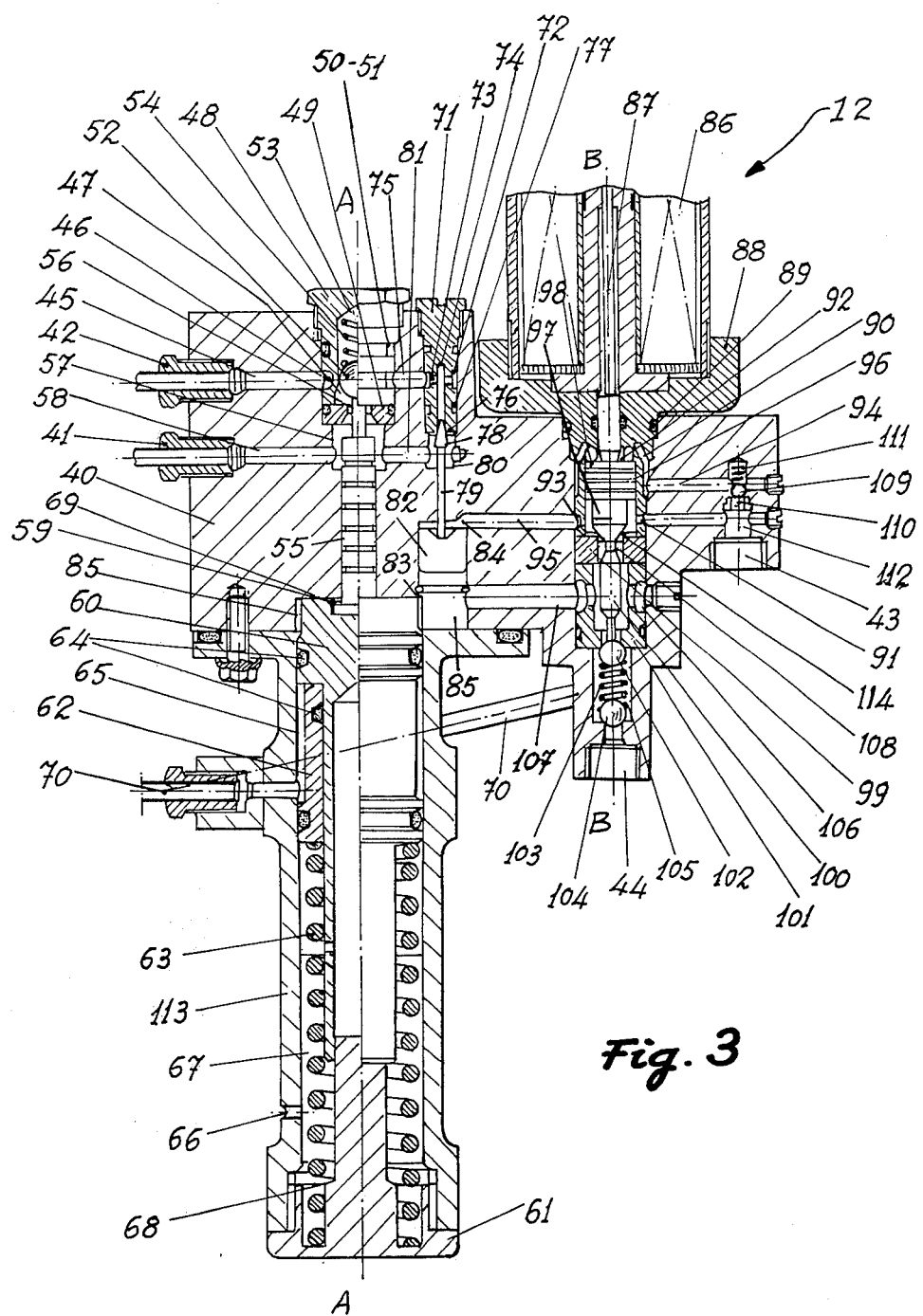

Some embodiments of the invention will now be described in detail, with reference to the accompanying drawings in which:

FIG. 1 shows in diagrammatic representation one form of braking system having a pressure control valve in accordance with the invention; and FIGS. 2 and 2a are similar representations of another form of braking system using the aforementioned embodiments of the invention; and FIG. 3 is an axial section of the pressure control valve means described by way of example only.

The braking system diagram shown in FIG. 1 indicates the vehicular rear wheel drive of a typical motor vehicle such as a passenger car or truck. The apparatus includes a transmission propeller shaft 1 driving the rear wheels 2 and 3 by way of a differential 4 and axles 5. The wheels 2 and 3 have a wheel-road interface with a road surface. Although various brake types may be employed, including disc brakes or other forms of decceleration means, the present invention is shown using drum brakes having the shoe actuating cylinders 6 and 7 receiving fluid through conduits 8, 9, 10 which are connected to the outlet passage 11 of the pressure control valve 12. A further conduit 13 connects the control valve inlet 14 to a fluid pressure source herein shown as a conventional master cylinder 15. Fluid is supplied to the master cylinder from a fluid reservoir 16 by way of a further conduit 17, operation of the master cylinder being controlled by an actuating pedal 18 which is connected to an appropriate linkage 19.

Thereby when the driver of the vehicle applies force to the pedal 18, pressure is generated in the master cylinder control conduits and slave cylinders in a manner familiar to those skilled in the art. The pressure control valve means 12 will normally permit fluid connection between conduits 11 and 14 thereby allowing slave cylinder fluid pressure to hydrostatically increase in proportion to the force excerted by the operator on the actuating pedal 18.

Also shown is a pump 20 to supply fluid pressure to the pressure sensitive member within the control valve 12 via a conduit 21. Fluid is supplied to the pressure source 20 by means of conduit 22 from the fluid reservoir 16. An electric motor 23 connected to the vehicle battery 24 is shown for the purpose of this description to provide a rotational drive for the pump 20. A pressure sensitive switch 25 effectively is used to control the fluid pressure within the second section of the pressure control valve 12. Alternative pump arrangements as shown in FIG. 2A could effectively be used without detracting from the purpose of the invention. A further conduit 26 connects the pressure control valve 12 to the reservoir 16 and serves as a pump return or drain means during controlled cycling of the valve 12.

It is an intentional feature of the invention that the master cylinder 15, conduits 8, 9, 10 and 13 and wheel cylinders 6 and 7 form an independent circuit and that any failure in the control valve means will not affect the aforementioned circuit, allowing braking to be brought about in the conventional manner.

The valve control means comprise a valve command module 27 for monitoring wheel velocity information and, in some cases, vehicle velocity information from a vehicle accelerometer 28 and wheel velocity transducers 29, 30. For the purpose of illustration the wheel velocity transducer are shown in the form of electromagnetic sensors operating in conjunction with a toothed ring or wheel mounted on the wheel brake drum or disc in a manner familiar to those skilled in the art. Clearly, without detracting from the purpose of the invention, velocity information could be provided by optical or radar means in a manner to provide a signal frequency or amplitude in proportion to the wheel velocity.

Also shown are indicating means 31 to inform the driver of the vehicle that the control system pressure is correct, and further means 32 to indicate failure of the pressure control valve or fluid pressure circuit loss.

The braking system shown in FIG. 2 indicates the use of two further pressure control valves 33 and 34 and respective velocity information and control means 35 and 36 for application of the present invention to the four wheels of a conventional vehicle. From the foregoing description relating to FIG. 1, it is apparent that the valves or means are employed to control the brake pressure over all four wheels.

The diagram shown in FIG. 2a indicates an alternative connection mode for the pump 20. Whereby for purposes of illustration the pump is shown mechanically and rotatably driven by other mechanical means, and the control circuit pressure is effectively maintained at a constant level by the use of an unloading valve or pilot operated relief valve 37 of an already known type. The pump drive could effectively be from the engine fan belt, dynamo shaft or other rotating member without detracting from the concept of the invention.

The diagram shown in FIG. 3 indicates an axial section taken throughout the body or housing member of the pressure control valve 12 in use and the parts of the valve are in the positions illustrated until an incipient skid is detected by the aforementioned pressure control means.

The body or housing 40 is provided in a suitable manner with conduit connections or ports 41, 42, 43 and 44 which are connected to the brake actuating cylinders 6 and 7, the master cylinder 15, the fluid reservoir 16 and to the secondary fluid pressure source 20 respectively by conduit means in the manner shown in FIG. 1.

Axially disposed along the line AA are the brake fluid pressure controlling members and secondary pressure sensitive members which will hereby be fully described.

From the conduit connection or port 42, a passageway 45 connects to an annular groove 46 and radial passages 47 formed within the threaded retaining member 48. A valve seat 49 is held in abutment with the housing 40 by means of the aforementioned retaining member. Two seals 50 and 51 exist along the bore containing the retaining member 48 and the seat 49 to eliminate any secondary leak path from the annular groove 46. A ball 52 is axially guided within a secondary bore 53 in the retaining member 48 and is downwardly (as shown in FIG. 3) biased towards the seat 49 by means of a helical spring 54. The aforementioned ball is held in an unseated position against the spring 54 by means of a spool or plunger 55 slidably guided within the body 40. Thus passageways 46 and 47 are held in fluid communication with the chamber 57, passageway 58 and the connection or port 41.

Spool 55 is retained axially attached to a sliding member or piston 60 by means of a clip 59 to permit radial alignment of both sliding components 55 and 60 thus eliminating expensive manufacturing techniques in producing axial bores associated with this type of mechanism.

The aforementioned piston member 60 is axially and slidably maintained within cylinder 113 by cylinder closure plug 61. A further annular piston 62 is slidably mounted on the first piston rod 60 and is biased upwardly (as shown in FIG. 3) by means of a helical compression spring 63. Seals 64 maintain the annular volume 65 in an oil tight condition during piston movement. An air vent 66 to atmosphere is provided to maintain atmospheric pressure in chamber 67. Abutment faces are provided at 68 and 69 within the housing and cylinder bodies to limit the axial displacement of the whole piston 60 and spool 55 assembly.

A conduit 70 shown here for the purposes of illustration connects chamber 65 to chamber 105, but could clearly be formed by passage ways within the housing 40 without detracting from the concept of the invention.

Considering the components displaced along BB, a screwed insert 71 has formed therein an annular groove 72, and radial passages 73 connecting the groove 72 with axial bore 74. The groove 72 is in fluid communication with passageway 75 which in turn forms part of the passageway 45 and the groove and 46. Seals 77 are inserted in such a manner as to prevent any secondary leakage from the aforementioned groove 72. A valve seat 76 is formed at the extremity of axial bore 74 to receive a conical valve member 78 therein, which is slidably guided by means of its reduced section 79 within the body or housing 40. A chamber 80 is connected by way of passage 81 to chamber 57. Effectively, valve member 78 and its seat 76 are hydraulically in parallel with valve ball 52 and respective seat 49.

The reduced portion 79 of the slidable valve member 78 is in an abutment relation with a piston means 82 which is slidably engaged in bore 84 within the housing 40. A ring 83 serves to maintain the piston 82 in place. The bore 84 is in fluid communication with further chamber 85 which is formed in the head end of the cylinder 113.

A solenoid unit 86 is provided to operate an axially guided armature 87 within a piston support 88 which is screwed or other-wise mounted within the body or housing 40. Seals 89 hermetically seal the aforementioned piston support and armature from the atmosphere. Radial holes 90 and 91 connect chambers 92 and 93 to passage ways 94 and 95 respectively. The large diameter portion 96 of the slidable piston 97 is guided within the aforementioned support 88. An orifice or slot 98 is provided in the piston 97 axially to effectively connect chambers 92 and 93.

A conical valve face 114 is provided in such a way as to close with seat 99 when biased downwardly at which time the reduced portion 100 of the piston 97 will open a further valve formed by ball 102 which is normally in contact with a seat 101. A further ball 104 is seated on the housing 40 to form a valve at the entry port 44. A helical compression spring 103 is placed in the chamber 105 to bias the balls 102 and 104 outwardly from each other towards their respective seat to provide the closed position.

The chamber 85 at the head of the piston 82 is fluidly connected to the chamber 93 by means of passageway 107, annular groove 106 formed in the seat member 101, and finally by way of the annular passage 108 which is connected to chamber 93.

A further check valve member 109 is biased to close with a seat 110 by helical spring 111. The aforesaid seat 110 has an axial bore communicating with chamber 112, which in turn is in free fluid communication with chamber 91 and external conduit port 43.

The aforementioned mechanism has been described to illustrate the construction of the said pressure control valve and could vary by way of concept without detracting from the scope of the invention.

Referring again to FIG. 1, the function of the pressure control valve will be described.

During an emergency or while braking on surfaces with a very low adhesion coefficient, it is probable that the driver of the vehicle could apply force to the brake pedal which would bring about a condition where the road wheels lock. Therefore it is necessary to control the downstream pressure at the wheel brake in terms of adhesion with the road surface or wheel slippage value, and independently of the upstream pressure applied by the driver.

When the wheel is approaching a locked condition, the pressure in the master cylinder 15 conduits 8 and 13, together with the brake actuating cylinders 6 and 7 can be considered as being at the same fluid pressure. In order to bring about the aforementioned pressure control, the control valve is cycled in a predetermined manner in order to close the connection between conduits 13 and 8 and reduce the pressure in the second or wheel conduit 8 by means of increasing its volume while the first conduit 13 remains fluidically closed, effectively isolating the influence of the drivers pedal effort on the wheel brake pressure.

The manner in which this, and further effects are brought about will now be fully described, in conjunction with the diagram shown in FIG. 3.

It will be remembered that the conduit connections 41, 42, 43 and 44 form the connections to the wheel brake circuit, master cylinder, return line to fluid reservoir and fluid pump means respectively and that in the non-operational position the solenoid 86 is deenergised. The plunger 55 is biased upwardly as shown in FIG. 3) and the reduced plunger part 56 maintains the ball 52 in a raised position against the spring 54 to allow fluid communication between ports 42 and 41 by way of the passage ways 45, 46, chamber 53 above seat 49 and thence via chamber 57 and passage 58.

The manner in which the plunger or spool 55 is so biased is by means of fluid pressure supplied at the housing port 44 from the aforementioned pump. Pressure will lift the ball 104 from its seat to push against the spring 103 and hold ball valve 102 in the closed position against seat 101. Fluid pressure will act along tube or conduit 70 to the differential area of secondary piston 62 and the rod side of main piston 60. As the main piston 60 is in abutment with the housing 40 at the face 69, the secondary piston 62 is biased downwardly against the compression spring 63 contained axially by the closure plug 61. At a predetermined pressure, the pump pressure is removed by means of a pressure sensitive switch 25 or other pressure limiting device. At this point, the spring 63 will excert a force over the piston 62 equal to the set pressure multiplied by the piston differential area. At this point, ball valve 104 will close on its seat and due to the hydraulic lock in volume 65, the entire spring force will be transferred to the piston 60. By means of the abutment with the plunger 55, the aforementioned ball 52 in the hydrostatic brake circuit is held open. It is an intended feature of the invention that the volume of oil stored in the chamber 65, conduit 70 and chamber 105 serves as a fluid pressure accumulator under the action of spring 63.

Pressure decay will cause the pump to supply fluid to maintain the accumulator effect by means of the closure of the pressure sensitive switch 25, and it is an intended feature of the invention that the pump duty cycle is thus reduced, eliminating wear problems associated with fluid pressure pump devices.

Also connected to the conventional brake circuit means is a further valve arrangement disposed along the axis BB. The axial bore 74 within the member 71 effectively connects chambers 53 and 57 (and thus conduit ports 41 and 42) across seat 76 and passage way 81.

Brake line pressure will act on the exposed area of the conical valve member 78 and produce a downward force equal to brake pressure multiplied by the area of plunger 79. The presence of this pressure will move piston 82 against stop ring 83 due to the existence of reservoir pressure in chamber 85. It is a further feature of the invention that this valve means is incorporated as a safety means and provides a "fail safe" feature which will later be described. A further passage way 95 serves to drain any leakage past the pin 79, and to evacuate chamber 84 during cycling of the piston 82. Thus during brake application, high pressure fluid flows also across the valve seat member 76 which is in effect disposed in parallel with valve seat member 49 and ball 52.

The solenoid armature 87 is axially connected to the slidable piston 97 and in the de-energised position the piston is not subjected to any axial force by means of the solenoid member and is hydraulically balanced by way of passage ways 90, 91, 94, 112 and the orifice 98, which expose the piston 97 to fluid reservoir pressure on its head and rod sides. The extended portion of the reduced piston portion 100 is in close proximity with the ball 102, and the net-down portion (disposed within seat 99) permits connection of the aforesaid passage way 107 to reservoir pressure across the annular passage 108.

When the solenoid 86 is energised by a signal from the control module, the armature 87 exerts a downward force over the piston member 97. The piston will thus be rapidly displaced until the conical valve portion 114 is firmly seated against member 99, meanwhile moving ball 102 from the seat 101. Fluid is supplied to the rear-moving end of piston 97 through the ball valve 109/110.

With the piston 97 downwardly displaced, the cycle of the valve effects the aforementioned closure of the brake circuit and reduction of downstream pressure in the following manner.

The volume of oil in the cylinder space 65 between pistons 60 and 62 is now in fluid communication with the piston head volume 85 by means of the conduit 70, seat 101 and passage 107. The piston surface exposed to the fluid pressure at its head is greater than the differential area on the rod side so the pressure held in space 65 will be applied to both sides of piston 60 forcing it to move downwardly. At the instant valve 102 is opened, the pressure sensitive switch 25 will restore full pump pressure at the inlet 44 to drive piston 60 against the force of the spring 63 until it contacts the stop 68, thus allowing the ball 52 to close with seat 49 under the action of spring 54 and brake master cylinder pressure. The plunger 55 is drawn downwardly with the piston 60 increasing the volume of the chamber 57 and reducing pressure at the outlet 41.

As pressure is applied to the chamber 85, it reacts upwardly on the area of piston 82 thus closing the valve member 78 of the plunger 79 with the seat 76, and thereby closing the secondary flow path between ports 41 and 42.

When the antiskid control module 27 is in the alerted or energised condition, the fluid pump 20 will be running, the initial oil volume 65 being used during the run-up time of the pump during the first valve operation.

Having released the pressure in the wheel cylinder to a predetermined level, a further signal will de-energise the solenoid means 86, thus permitting the piston member 97 to move upwards and close the valve 102. At this point, full pump pressure will be applied to chamber 65 in the manner heretofore described to repeat the cycle, driving piston 60 upwardly against the abutment 69 and re-compressing spring 63 with the action of secondary piston 62.

The plunger 55 will be re-introduced into chamber 57 thereby reducing the effective brake line volume and increasing pressure until it re-opens valve ball 52 by means of the plunger extension 56, these connecting ports 41 and 42.

During the upward stroke of piston 60 and plunger 55, fluid contained in the chamber 85 is evacuated through passage 107 and through annular orifice 108 formed between seat 99 and piston part 100. The rate of discharge of this liquid will determine the time cycle for the "increasing pressure" stroke. The annular orifice 108 will variably control the pressure drop between chambers 107 and 93 due to the length of engagement of member 100 within the seat 99. The cycle time for the upward stroke of piston 97 is governed by the orifice 98 equalising the pressure contained in chamber 92 against the closed valve formed by the ball 109 and seat 110. The same effect could be achieved by restricting the flow through holes 91 by a throttling edge of the piston 97 in a known manner, to effect variation in the pressure increase slope of the actuating cycle.

In an alternative form of the invention, the return stroke time of the piston 97 could be varied according to the road adhesion coefficient values detected by the control system, by means of a variable orifice in place of orifice 98, the control being effected by a solenoid member or another means.

It is intended that the pressure control valve means are capable of operating at frequencies up to 10Hz, which allows modulation of brake line pressure rather than alternative locking and releasing of the braked road wheel as in other known forms of actuating valves.

As fluid pressure in chamber 85 falls to a level determined by the differential area between piston 82 and seat diameter 76 multiplied by brake line pressure, the valve member 78 will move from seat 76, thus providing the secondary flow path through the security valve means.

As heretofore mentioned, the conventional vehicle brake circuit is broken by the control valve interface by way of the valve means 49/52. If for any reason the ball 52 were seated inadvertantly, the driver would lose control of wheel braking. It is an intended feature of the invention to eliminate this known design shortcoming, appreciated by those familiar with the art. Spring or solenoid failure, fracture of pin 56 or siezure of assembly 55 or 60, together with a failure of pump pressure (total or partial) will only render the brake line in the open or "normal" condition.

The features in the overall function of the pressure control valve means has been described by way of example only and variations of components could be effected without detracting from the concept of the invention.

What is claimed is:

1. A pressure control valve applicable to anti-skid devices in automobile vehicles, said valve comprising first and second hydraulically independent fluid circuit means, said first circuit means including brake circuit fluid for controlling actuation of vehicle's brakes, said second circuit means including control fluid for controlling braking effect of the vehicle's wheels to avoid skidding of the vehicle, first piston means associated with said first circuit means for main actuation of said control valve, second piston means associated with said second circuit means to serve as an intermediary between said control fluid and a spring, said spring being disposed in said control valve against said second piston means to accumulate energy when compressed by said second piston means to provide a differential unit, valve means being provided in said control valve for connecting a conventional brake circuit of the vehicle to an anti-skid system of the vehicle, said differential unit coacting on said first piston means to provide axial movements of said first and second piston means for compressing and decompressing said brake circuit fluid and for opening and closing said valve means, whereby said first and second circuit means are related through functions of said first and second piston means.

2. A control valve as claimed in claim 1, wherein said first piston means includes a first piston and said second piston means includes a second piston, said second piston being coaxially mounted on said first piston, said second piston being in a slidable arrangement with said first piston to permit said second piston to slide along said first piston.

3. A control valve as claimed in claim 1, including switch valve means to transfer the control fluid pressure to alternate sides of said first piston means and to control the control fluid discharge rate from a head portion of said first piston means, said switch valve means including a single plunger or spool.

4. A control valve as claimed in claim 3, wherein said switch valve means controlling the control fluid discharge rate includes an orifice in parallel with said switch valve spool to control its stroke speed when moving in one direction, said orifice being fixed in size or variable in accordance with road/wheel adhesion information.

5. A control valve as claimed in claim 4 including means for utilizing a pressure differential across said switch valve spool which is induced by discharging cylinder head control fluid to control the spool speed by discharging higher pressure control fluid through said orifice.

6. A control valve as claimed in claim 3 including check valve means in parallel with said switch valve spool to allow rapid movement in one direction.

7. A control valve as claimed in claim 3 including secondary or security valve means connected in parallel with said switch valve means and in fluid communication with both upstream and downstream brake conduits, said secondary valve means including a check valve and operating piston means to provide a secondary fluid path in parallel relationship with said switch valve means to permit normal brake functioning in the event of a failure of the latter.

8. A control valve as claimed in claim 7, wherein said secondary valve means is designed to close a connection between the upstream and downstream brake conduits by way of main actuating piston pressure or independent control fluid pump pressure acting on said operating piston means, whereby failure of the actuating pressure source will render said secondary valve means open, and the vehicle brake circuit will be unaffected.

9. A control valve as claimed in claim 8, including alternative means to affect the closure of the brake conduits and reduce downstream break pressure whereby said secondary valve means used to close said conduit connection and said switch valve spool is used only to reduce downstream brake pressure, eliminating the principal valve components.

10. A control valve as claimed in claim 1, wherein said first piston means includes an actuating piston and a plunger joined axially, said piston and plunger being held in axial unison but being able to displace radially relative to each other, thereby eliminating the requirement for perfect concentricity and alignment between their respective guiding bores or members.

* * * * *